(12) United States Patent
Redpath

(10) Patent No.: US 9,077,770 B2
(45) Date of Patent: Jul. 7, 2015

(54) MOBILE WEB APP INFRASTRUCTURE

(75) Inventor: Richard Redpath, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 554 days.

(21) Appl. No.: 13/464,415

(22) Filed: May 4, 2012

(65) Prior Publication Data

US 2012/0317233 A1 Dec. 13, 2012

Related U.S. Application Data

(63) Continuation of application No. 13/158,885, filed on Jun. 13, 2011, now abandoned.

(51) Int. Cl.
*G06F 15/16* (2006.01)
*H04L 29/06* (2006.01)
*H04L 29/08* (2006.01)
*H04W 4/00* (2009.01)

(52) U.S. Cl.
CPC ............... *H04L 67/38* (2013.01); *H04L 67/28* (2013.01); *H04W 4/003* (2013.01); *H04L 67/04* (2013.01); *H04L 67/02* (2013.01)

(58) Field of Classification Search
None
See application file for complete search history.

(56) References Cited

U.S. PATENT DOCUMENTS

| | | | |
|---|---|---|---|
| 7,155,519 B2 | 12/2006 | Lo | |
| 7,475,408 B2 | 1/2009 | Alcazar et al. | |
| 8,069,213 B2 * | 11/2011 | Bloch et al. | 709/206 |
| 8,266,434 B2 * | 9/2012 | Muller et al. | 713/168 |
| 8,543,726 B1 * | 9/2013 | Kann et al. | 709/238 |
| 2004/0243832 A1 * | 12/2004 | Wilf et al. | 713/200 |
| 2008/0073432 A1 * | 3/2008 | Barenburg et al. | 235/385 |
| 2008/0104262 A1 | 5/2008 | Katz | |
| 2008/0250152 A1 | 10/2008 | Chou | |
| 2009/0055749 A1 | 2/2009 | Chatterjee et al. | |
| 2009/0144408 A1 * | 6/2009 | Wilf et al. | 709/224 |
| 2009/0217354 A1 | 8/2009 | Blum | |
| 2009/0259744 A1 | 10/2009 | Kolke | |
| 2010/0017061 A1 | 1/2010 | Kokkevis et al. | |
| 2011/0246514 A1 | 10/2011 | Bartholomew | |
| 2011/0246661 A1 | 10/2011 | Manzari | |

FOREIGN PATENT DOCUMENTS

GB 2441350 A * 3/2008

* cited by examiner

*Primary Examiner* — Joshua Joo
(74) *Attorney, Agent, or Firm* — Charles L. Moore; Moore & Van Allen PLLC

(57) ABSTRACT

A method, device and computer program product for forming a mobile web app infrastructure on a device may include creating a local web app server on the device in response to an application being started on the device. A proxy uniform resource locator (URL) address may be provided by the local web app server that enables the device to access an out of security URL to perform a function associated with the application.

25 Claims, 2 Drawing Sheets

MOBILE WEB APP INFRASTRUCTURE

CROSS REFERENCE TO RELATED APPLICATION

This application is a continuation application of U.S. patent application Ser. No. 13/158,885, filed Jun. 13, 2011, the contents of which are incorporated herein by reference.

BACKGROUND

Aspects of the present invention relate to electronic devices including but not limited to communications devices adapted to run mobile web applications or web apps, and more particularly to a method, device and computer program product for a seamless mobile web app infrastructure.

New applications or apps for installation and use on mobile devices, such as smart phones, pad computers and the like are continuously being created that provide various types of features, functions and operations. An application in general utilizes a platform infrastructure on the mobile device for operation. Native applications can access device specific resources through the use of this platform infrastructure. All smart phones provide a native browser but limit the ability for a web application or application that is accessed over a network, such as the Internet or other network, to use the device specific resources. Accessing the device specific resources under these circumstances is not seamless and may require the user to perform certain operations in order for the web application to access the device resources. Being able to access native device resources by a web application has been partially addressed with the advent of software such as PhoneGap. PhoneGap essentially fills in the gaps with documented new features for the JavaScript navigator object. PhoneGap is an open-source mobile development framework developed by Nitobi Software and IBM. PhoneGap is a trademark of Nitobi Software, Inc. in the United State, other countries or both. IBM is a trademark of International Business Machines, Inc. in the United States, other countries or both. PhoneGap enables software programmers to build applications for mobile devices using JavaScript, Hypertext Mark-up Language (HTML), Cascading Style Sheets (CSS) or similar languages, rather than less known languages such as Objective-C. The browser solution is advantageous in that it resolves security issues and provides proven layouts and user interface (UI) mechanisms. On the other hand, these web applications or web apps are not applications by definition as they have to establish a connection to a web site for the execution of code and layout. This process may also not be seamless and may require additional input from the user. A web app is basically a website built with web standard technologies and is available from a uniform resource locator (URL) specification. This is in contrast with native apps which are installed on the device and use native application programming interfaces (APIs) and languages. Because web apps require accessing a website over a network there are security issues that need to be addressed. Additionally, the web app model is complex and not seamless as discussed above. Accordingly, there is a need for a new model that can overcome these security and user interface issues.

BRIEF SUMMARY

According to one aspect of the present invention, a method for forming a mobile web app infrastructure on a device may include creating a local web app server on the device in response to an application being started on the device. The method may also include providing a proxy uniform resource locator (URL) address by the local web app server that enables the device to access an out of security URL to perform a function associated with the application.

According to another aspect of the present invention, a device may include a processor and a local web app server created on the processor in response to an application being started on the device. The local web app server provides a proxy URL that enables the device to access an out of security URL to perform a function associated with the application.

According to a further aspect of the present invention, a computer program product for forming a mobile web app infrastructure may include a computer readable storage medium having computer readable program code embodied therewith. The computer readable program code may include computer readable program code configured to create a local web app server on the device in response to an application being started on the device. The computer readable program code may also include computer readable program code configured to provide a proxy URL address that enables the device to access an out of security URL to perform a function associated with the application.

BRIEF DESCRIPTION OF THE SEVERAL VIEWS OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein.

DETAILED DESCRIPTION

Figure 1:
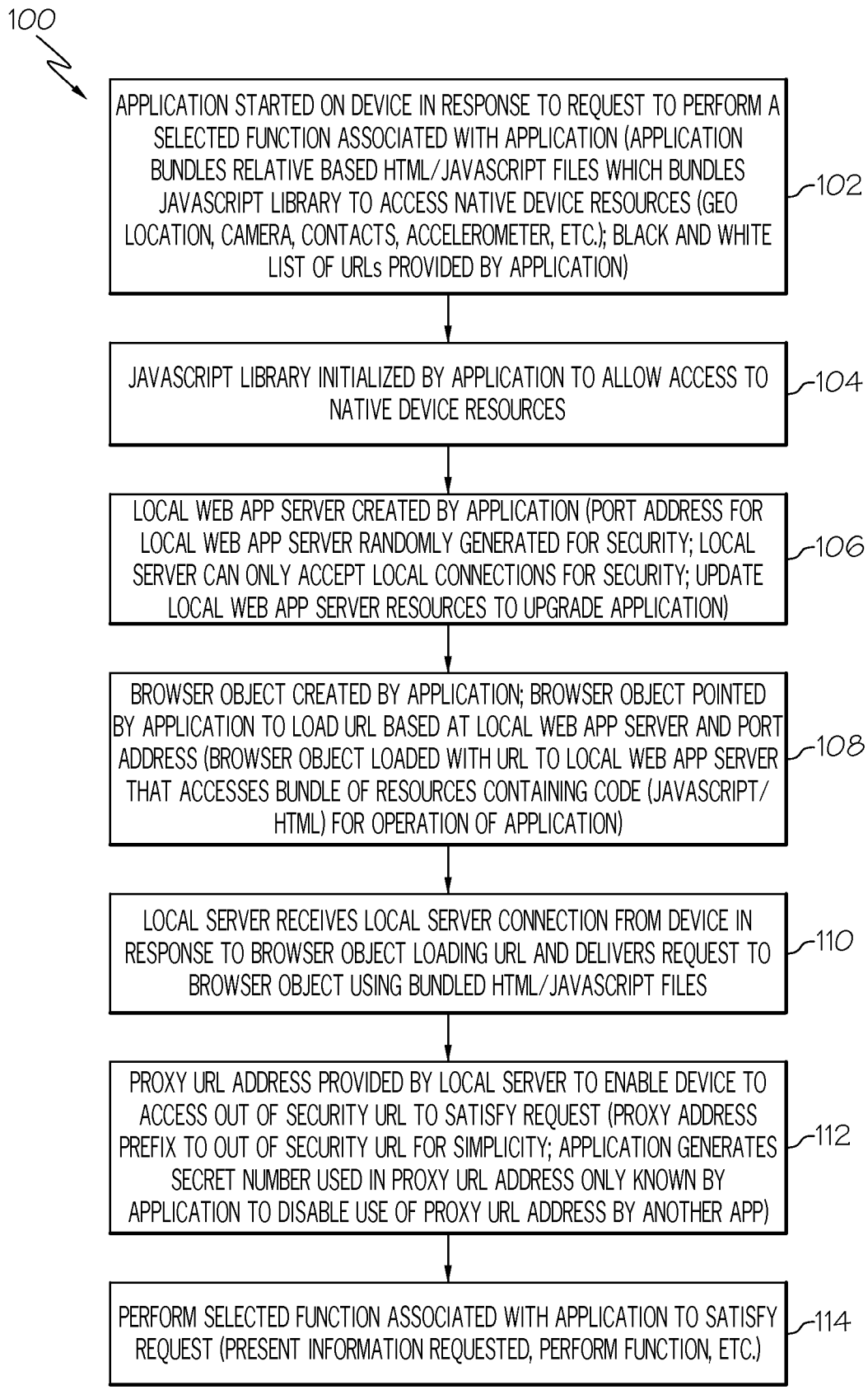
FIG. 1 is flowchart of an example of a method for forming a mobile web app infrastructure in accordance with an embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is flowchart of an example of a method 100 for forming as mobile web app infrastructure in accordance with an embodiment of the present invention. In block 102, an application may be started on a device in response to a request to perform the application or a selected function associated with the application. The application may be a web app on a communications device, such as a smart phone or similar communications device. The application may bundle relative based HTML or JavaScript files which bundle a Java script library to access native device resources embodied or stored on the device and accessible by native device applications. By relative based, the HTML code for a URL has entries similar to /images/myimage.jpg for example rather than hard coding the host address or path, such as for example ibm.com/myapp/images/myimage.jpg. The resources for the URL are relative to the starting point ibm.com/myapp that may have been typed in the browser. This permits moving website resources to a different location without having to edit the HTML code. In the present invention, it web site may be from a local server on the device or at an Internet location such as for example ibm.com. Essentially, the web HTML code on the device can be reused, or the browser may be used to go to a non local server URL, or server not on the device, and may obtain a more up to date version to work with. Accordingly the resources for the web app may be updated in accordance with an embodiment of the invention with newer HTML files to update the application seamlessly.

Examples of the native device resources may include but is not necessary limited to a mechanism to determine geographic location, a camera, a contacts file, an accelerometer and other resources that permit the device to perform native applications on the device.

In block 104, a library or JavaScript library may be initialized by the application to allow access to the native device resources. In block 106, a local web app server may be created by the application. A port address for the local web app server may be randomly generated for security purposes. The port address may be randomly generated by the application or by some other utility application on the device. The local web app server may only accept local connections for security purposes. The device cannot accept connections not from the device or phone. Accordingly, someone on the Internet cannot connect to the device or phone even if they know the random port address. Other apps on the device or phone could connect but are blocked by using a proxy with a secret number as described herein. The local web server which includes the application may be updated with HTML/JavaScript (resources) to upgrade the application to a new version.

In block 108, a browser object may be created by the application or by another application or utility. The browser object may be pointed by the application to load a URL based at the local web app server and port address. The browser object may be loaded with the URL to the local web app server that may access the bundle of resources containing code for operation of the application. The code may be in JavaScript or HTML, or other similar code to reduce the complexity of the infrastructure and to utilize the security and user interface maturity of standard web browser technologies for a programming interface. Standard HTML/JavaScript without augmentations to the standard code may be provided, such as jQuery. A secure structure or process is thus provided for using the web app on the device. In this respect, websites or URLs whose security and freedom from any viruses or other code which could be harmful to the device is unknown may be accessed.

In block 110, the local web app server may receive a local server connection from the device in response to the browser object loading the URL. The request to perform the selected function associated with the application may be received by the local web server and delivered to the browser object using the bundled HTML or JavaScript files or other files. Because a local server is being used and not file URLs, the local server can proxy data requests to other servers and a mechanism for credential validation may be provided to enable login to these off the device servers to deliver data that is accessible by the user with the credentials.

In block 112, a proxy URL address may be provided by the local server to enable the device to access out of security websites or URLs to satisfy the request. Out of security websites or URLs may be defined as websites or URLs that are unknown or non-secure or whose security or freedom from any code which could cause harm to the device may not be known. The proxy URL address may be a prefix to the out of security URL or website. For example, if the web app would like to access the National Weather Service (NOAA) at "http://www.weather.gov," the URL may be rewritten in the form of the proxy address with a prefix, such as "proxy?http://www.weather.gov."

The application may also generate a secure or secret number that may be used in the proxy URL address that is only known by the application or web app to disable or prevent use of the proxy URL address by any other web apps or applications.

In block 114, the selected function associated with the application may be performed to satisfy the request. For example, continuing the example above, the request may have been to present the weather forecast for a predetermined number of days, for example, four days. Accordingly the information may be retrieved from the remote or out of security website and presented on the device to the user.

The application may also provide a black-and-white list of URLs that are allowed to be accessed by the local web app server. This list can be an additional bundle accessed in response to the application being started. A black list may be a list of URLs that are not allowed to be commonly accessed. These may be URLs of certain companies or other entities. The white list may be a list of only URLs that are accessible by the local web app server.

The example discussed above of displaying the weather forecast using data from the National Weather Service will be described in more detail with regard to an embodiment of the mobile web app infrastructure of the present invention to further describe the invention. Displaying the images of a multiple day weather forecast may be done in HTML using Portable Network Graphics (PNG) files or similar code on any mobile phone browser. In accordance with an embodiment of the present invention, the website resource (icons and HTML for layout) may be included with the application. Similar to that previously discussed a local URL on the device may be created and used. The application may be simply an instance of a browser object and an instance of a local web server similar to that previously described. The application may access a resource bundle (a URL) for the data essentially to a local web site.

The device application platform would create an instance of a browser object. The browser object would create a server socket at a random port number for example 26512 but 8080 may be used for prototyping. A random port is used since there maybe other like applications. The server socket only accepts connections local at 127.0.0.1 so the port is secure basically stranded. The browser object may make a connection to the server socket at 127.0.0.1:8080 in the test case or at 127.0.0.1:26512 for the start page of a default start.html. The server socket knows where to access the storage to get this file associated with the application.

The application requires an out of URL security access to achieve the results (http://www.weather.gov/) or satisfy the request of displaying the weather forecast for the next predetermined number of days. The weather content is easy to display using HTML but it needs to access the National Weather Service (NWS) to get the multiple day forecast which is XML data that is returned.

There may be some code, such as JavaScript that is written to periodically update the information at predetermined time interval, for example every thirty minutes. The JavaScript may use a new function like the mashup iWidget iContext function to rewrite a URL to go through a proxy that can proxy the request making the browser on the device think the URL is a secure URL accessed in context to the page.

Assuming a request for a four day weather forecast, the following JavaScript code for the NWS for a particular zip code may be as follows:

```
var request=
'http:
//www.weather.gov/forecasts/xml/sample_products/browser_interface/
ndfdBrowserClientByDay.php
?zipCodeList=');
request+=zip+
"&format=24+hourly&startDate="+
datestring+
"&numDays=4"
```

Which produces the following string:

```
"http:
//www.weather.gov/forecasts/xml/sample_products/browser_interface/
ndfdBrowserClientByDay.php?zipCodeList=27513&format=
24+hourly&startDate=2010-10-12&numDays=4"
```

Rewriting the request using a rewrite rule rewrites the out of security URL to include a prefix to provide the proxy address to the local server. The request to the proxy address may result in the following final request:

```
proxy?http/www.weather.gov/forecasts/xml/sample_products/
browser_interface/ndfdBrowserClientByDay.php?zipCodeList=
27513&format=24+hourly&startDate=2010-10-12&numDays=4
```

The URLs are relative URLs so the host or port address does not need to be in the rewritten address since the browser object knows where the web page came from. However, some rewrite functions may put in the host or port address since the address is known. The rewrite rule knows what port the local server is running for the application and redirects the URL to the local server which handles the proxy process.

A xhrGet command may be used to get the URL data and use it to edit the Document Object Model (DOM) as follows:

```
dojo.xhrGet({url: widgetURL,
handleAs: "text",
timeout: 20000, //20 seconds
load: function(response, ioArgs) {
var xmlDoc=dojox.xml.parser.parse(response);
```

```
    var forecastconditions=xmlDoc.getElementsByTagName("weather");
    parse it whatever
    },
    error: function(response, ioArgs){
    }
    });
```

The server socket will look for /proxy to see if a proxy request is to be done and check the URL www.weather.gov to see if it is in the white/black board or white and black lists with respect to security or authorization for accessing the URL. For strong security the blackboard would be * and the whiteboard would be www.weather.gov, so the only URL that can be accessed is www.weather.gov.

It is not necessary to write JavaScript to use the proxy resource. An html page can be created which uses the proxy as an href. For example, the Nation Weather Service provides a means to generate a portable network graphics (PNG) file for a radar map of weather given a zip code.

A meta refresh tag could be added to the file to refresh the data at predetermined time interval, such as for example every 30 minutes.

Figure 2:
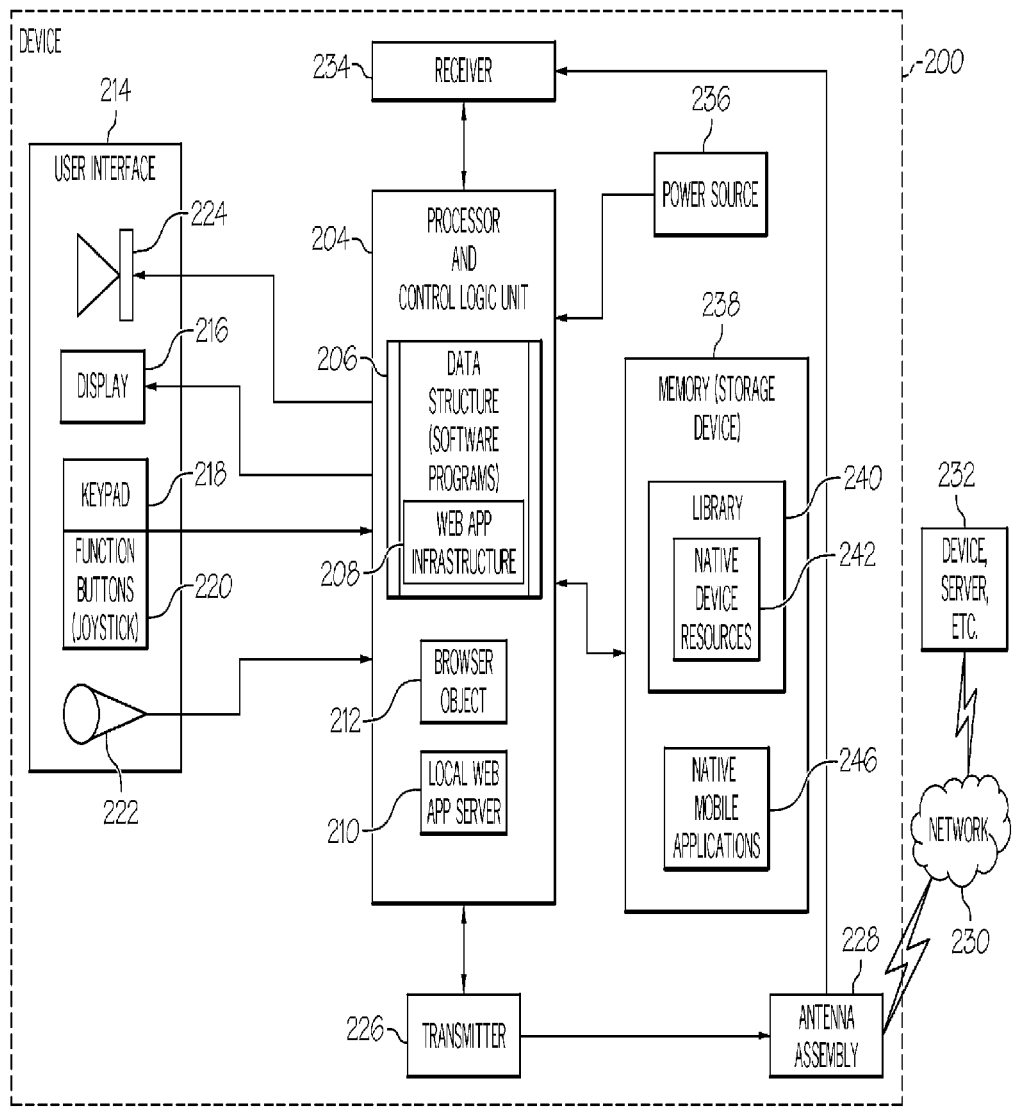
FIG. 2 is a block schematic diagram of an example of an electronic device including a mobile web app infrastructure in accordance with an embodiment of the present invention.

FIG. 2 is a block schematic diagram of an example of a device 200 which may be a mobile device including a mobile web app infrastructure 202 in accordance with an embodiment of the present invention. The method 100 may be embodied in and performed by the device 200. The device 200 may be a communications device, such as a smart phone, tablet computer, lap top or similar device. The device 200 may include a processor and control logic unit 204. The processor and control logic unit 204 may be a microprocessor or the like. The processor and control logic unit 204 may include data structures or software programs 206 or code including computer-executable or computer-readable instructions to control operation of the device 200 and its components. The data structure or software programs 206 may include computer-executable instructions for carrying out the web app infrastructure functionality similar to that described herein. For example, the data structures and software programs 406 may include a web app infrastructure module or application 208 to form the web app infrastructure and to perform the operations associated therewith similar to that previously described. The functions and operations of the method 100 in FIG. 1 may be embodied in the application or module 208. Similar to that previously described, a local web app server 210 may be formed to receive any requests, such as a request to access a remote or out of security website or URL. Browser proxy 212 may also be created similar to that previously described.

The device 200 may include an operator or user interface 214 to facilitate controlling operation of the device 200 including but not necessarily limited to performing specific functions associated with an application or app, running web apps similar to that described herein, initiating and conducting phone calls, and other functions. The user interface 214 may include a display 216 to provide visual signals to a subscriber or user as to the status and operation of the device 200. The display 216 may be a touch screen to permit receiving user inputs for control of the device 200. The display 216 may be a liquid crystal display (LCD) or the like capable of presenting color images. The display 216 may provide information to a user or operator in the form of images, text, numerals, characters, a graphical user interface (GUI) and the like.

The user interface 214 may also include a keypad 218 or keyboard and function keys or buttons 220. the keypad or keyboard may also be presented on the display 216 in the case of a touch screen. The keypad 218 or keyboard, function buttons 220 may permit the user to communicate commands to the device 200 to dial phone numbers, initiate and terminate calls, establish other communications, such as access to the Internet, send and receive email, text messages and the like.

The user interface 214 may also include a microphone 222 and a speaker 224. The microphone 222 may receive audio or acoustic signals from a user or from an acoustic source, such as a radio, television or the like. The microphone 222 may convert the audio or acoustic signals to electrical signals. The microphone 222 may be connected to the processor and logic unit 204 wherein the processor and logic unit 204 may convert the electrical signals to baseband communication signals. The processor and control logic unit 204 may be connected to a transmitter 226 that may convert baseband signals from the main processor and control logic unit 204 to radio frequency (RF) signals. The transmitter 226 may be connected to an antenna assembly 228 for transmission of the RF signals to a communications medium or system, cellular system or network 230 or similar wireless communications system to establish communications with other devices, such as a device 232, server or the like.

The antenna assembly 228 may receive RF signals over the air and transfer the RF signals to a receiver 234. The receiver 234 may convert the RF signals to baseband signals. The baseband signals may be applied to the processor and control logic unit 204 which may convert the baseband signals to electrical signals. The processor and control unit 204 may send the electrical signals to a speaker 224, which may convert the electrical signals to audio signals that can be understood by the user, or the processor and control unit 204 may convert the signals to other signals for presentation on the display 216, such as text messages, data from a website or other information.

A power source 236 may be connected to the processor and control logic unit 304 to provide power for operation of the device 200. The power source 236 may be a rechargeable battery or the like. The communications device 200 may also include at least one data storage device 238. The data storage device 238 may include a library 240 for storing data for use by the device 200. For example, the library 240 may store native device resources 242 for use by native mobile applications 246 which may also be stored in the memory or storage device 238 and may be run on the processor and control logic unit 204. The data storage device 238 may be a computer-readable storage medium to store computer-executable or computer-usable instructions or data structures, such as data structures 206, to perform special operations or functions such as those described in accordance with embodiments of the present invention.

The device 200 may be operable in association with the communications system, medium or network 230 in accordance with an embodiment of the present invention. The communications system, medium or network 230 may be a mobile, wireless, cellular communications system or similar system.

The layout and design illustrated in FIG. 2 is for purposes of explaining the present invention and the present invention is not limited to any particular design. While the device 200 illustrated in FIG. 2 is a wireless communications device, the present invention may also be applicable to wired or hard wired communication devices and systems.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to embodiments of the invention in the form disclosed. Many modifications and variations will be apparent to those of ordinary skill in the art without departing from the scope and spirit of embodiments of the invention. The embodiment was chosen and described in order to best explain the principles of embodiments of the invention and the practical application, and to enable others of ordinary skill in the art to understand embodiments of the invention for various embodiments with various modifications as are suited to the particular use contemplated.

Although specific embodiments have been illustrated and described herein, those of ordinary skill in the art appreciate that any arrangement which is calculated to achieve the same purpose may be substituted for the specific embodiments shown and that embodiments of the invention have other applications in other environments. This application is intended to cover any adaptations or variations of the present invention. The following claims are in no way intended to limit the scope of embodiments of the invention to the specific embodiments described herein.

What is claimed is:

1. A method for forming a mobile web app infrastructure on a device, comprising:
   creating a local web app server on the device in response to an application being started on the device; and
   providing a proxy uniform resource locator (URL) address by the local web app server that enables the device to access an out of security URL to perform a function associated with the application, wherein the proxy URL address comprises a feature which is known only by the application to disable use of the proxy URL address by another application.

2. The method of claim 1, wherein providing the proxy URL address comprises adding a prefix to the out of security URL.

3. The method of claim 1, further comprising generating a secret number used in the proxy URL address which is known only by the application to disable use of the proxy URL address by another application.

4. The method of claim 1, further comprising initializing a library to allow access to a plurality of native resources on the device.

5. The method of claim 1, further comprising generating a port address for the local web app server randomly.

6. The method of claim 5, further comprising creating a browser object, wherein the browser object is pointed to load a URL based at the local web app server and port address.

7. The method of claim 6, further comprising receiving a local server connection from the device by the local web app server and delivering a request to the browser object using bundled HTML or JavaScript files.

8. The method of claim 1, further comprising creating a browser object loaded with a URL to the local web app server that accesses a resource bundle comprising computer useable code for operation of the application.

9. The method of claim 1, further comprising accepting only local connections by the local web app server for security.

10. The method of claim 1, further comprising providing a list of URLs that are allowed to be accessed by the local web app server.

11. The method of claim 1, further comprising updating the local web app server to upgrade the application to a new version on the local web server.

12. A device, comprising:
   a processor;
   a local web app server created on the processor in response to an application being started on the device, wherein the local web app server provides a proxy URL address that enables the device to access an out of security URL to perform a function associated with the application, and wherein a feature is used in the proxy URL address that is known only by the application to disable use of the proxy URL address by another application.

13. The device of claim 12, further comprising a library comprising a plurality of native resources on the device.

14. The device of claim 12, further comprising a browser object created by the application, wherein the browser object is pointed to load a URL based at the local web app server and port address for the local web app server that is randomly generated.

15. The device of claim 12, further comprising a browser object loaded with a URL to the local web app server that accesses a bundle comprising computer code for operation of the application.

16. The device of claim 12, wherein the proxy URL address comprises a prefix to the out of security URL.

17. The device of claim 12, wherein the local web app server adds a prefix to a proxy URL address of the out of security URL.

18. The device of claim 12, wherein a port address for the local web app server is randomly generated.

19. The device of claim 12, wherein only local connections from the device are accepted by the local web app server.

20. A computer program product for forming a mobile web app infrastructure on a device, the computer program product comprising:
- a non-transitory computer readable storage medium having computer readable program code embodied therewith, the computer readable program code comprising:
- code configured to create a local web app server on the device in response to an application being started on the device;
- code configured to provide a proxy URL address that enables the device to access an out of security URL to perform a function associated with the application; and
- code configured to generate a feature used in the proxy URL address which is known only by the application to disable use of the proxy URL address by another application.

21. The computer program product of claim 20, wherein the computer readable program code further comprises computer readable program code configured to generate a port address for the local web app server randomly.

22. The computer program product of claim 21, wherein the computer readable program code further comprises computer readable program code configured to create a browser object, wherein the browser object is pointed to load a URL based at the local web app server and port address.

23. The computer program product of claim 22, wherein the computer readable program code further comprises computer readable program code configured to receive a local server connection from the device by the local web app server and delivering a request to the browser object using bundled HTML or JavaScript files.

24. The computer program product of claim 20, wherein the computer readable program code configured to provide a proxy URL address comprises computer readable program code configured to add a prefix to the out of security URL.

25. The computer program product of claim 20, further comprising computer readable program code configured to create a browser object loaded with a URL to the local web app server that accesses a resource bundle comprising computer useable code for operation of the application.

* * * * *